United States Patent
Bera et al.

(10) Patent No.: US 10,834,381 B1
(45) Date of Patent: Nov. 10, 2020

(54) VIDEO FILE MODIFICATION

(71) Applicant: INTERNATIONAL BUSINESS MACHINES CORPORATION, Armonk, NY (US)

(72) Inventors: Jhilam Bera, Bangalore (IN); Vijay Kumar Ananthapur Bache, Bangalore (IN); Saravanan Sadacharam, Chennai (IN); Vijay Ekambaram, Chennai (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/521,666

(22) Filed: Jul. 25, 2019

(51) Int. Cl.
*G06N 20/00* (2019.01)
*H04N 13/178* (2018.01)
*H04N 13/383* (2018.01)

(52) U.S. Cl.
CPC .......... *H04N 13/383* (2018.05); *G06N 20/00* (2019.01); *H04N 13/178* (2018.05)

(58) Field of Classification Search
CPC .............................. H04N 13/383; G06N 20/00
See application file for complete search history.

(56) References Cited

U.S. PATENT DOCUMENTS

| 8,854,415 | B2* | 10/2014 | Tong | H04N 7/157 348/14.07 |
| 10,445,614 | B2* | 10/2019 | Peng | G06K 9/00335 |
| 10,489,719 | B2* | 11/2019 | Yates | G06Q 50/01 |
| 2003/0086003 | A1* | 5/2003 | Koga | H04N 21/21805 348/218.1 |
| 2014/0340478 | A1* | 11/2014 | Kwong | H04N 19/147 348/43 |
| 2016/0328738 | A1* | 11/2016 | Liu | G06Q 30/0242 |
| 2017/0013283 | A1* | 1/2017 | Zhang | H04N 21/23109 |
| 2017/0104927 | A1* | 4/2017 | Mugavero | G06F 3/012 |
| 2017/0316806 | A1* | 11/2017 | Warren | G11B 27/031 |

(Continued)

FOREIGN PATENT DOCUMENTS

EP        21716901 A        4/2010

OTHER PUBLICATIONS

Hosseini, Mohammad et al.; Adaptive 360 VR Video Streaming: Divide and Conquer!; 2016 IEEE International Symposium on Multimedia; Dec. 11-13, 2016; 6 pages.

(Continued)

*Primary Examiner* — Irfan Habib
(74) *Attorney, Agent, or Firm* — Schmeiser, Olsen & Watts; Brian M. Restauro

(57) ABSTRACT

A method and system for modifying a video file is provided. The method includes continuously receiving a video stream. A video frame of the video stream is divided into viewport portions each including an associated meta data portion. An eye focus of a user with respect to a first viewport portion is detected and a resulting importance score is determined for each viewport portion. Viewing trajectories for viewing each viewport portion are determined and a first group of viewport portions and a second group of viewport portions are determined. A payoff matrix associated with the viewing trajectories is generated and a best possible decision for the user with respect to viewing the viewport portions is generated. A third group of viewport portions is determined and presented with respect to the best possible decision.

20 Claims, 11 Drawing Sheets

(56) References Cited

U.S. PATENT DOCUMENTS

2018/0189958 A1* 7/2018 Budagavi ............ H04N 21/6587
2018/0278936 A1* 9/2018 Hendry ................ H04N 19/124
2018/0374192 A1* 12/2018 Kunkel ................. G06T 15/205
2019/0381355 A1* 12/2019 Cooper .............. A63B 24/0021

OTHER PUBLICATIONS

Zimmerman, Roger; 360° Video Technology Exploration; FXPAL & Media Management Research Lab, NUS School of Computing; Dec. 16, 2016; 65 pages.

* cited by examiner

VIDEO FILE MODIFICATION

BACKGROUND

The present invention relates generally to a method modifying and presenting a video stream and in particular to a method and associated system for improving video-based software technology for dividing a video frame into viewpoint portions associated with an eye focus of a user for presentation.

SUMMARY

A first aspect of the invention provides a video file modification and presentation method comprising: continuously receiving, by a processor of an electronic device, a video stream; dividing by the processor, a video frame of the video stream into a plurality of viewport portions, wherein each viewport portion of the plurality of viewport portions comprises an associated meta data portion; detecting, by the processor via a sensor of the electronic device, an eye focus of a user with respect to a first viewport portion of the plurality of viewport portions; determining, by the processor executing machine learning code with respect to results of the detecting, an importance score for each the viewport portion; determining, by the processor based each the importance score, viewing trajectories for viewing each the viewport portion; determining, by the processor based on the viewing trajectories, a first group of viewport portions of the plurality of viewport portions, wherein the first group of viewport portions is associated with predicted viewing patterns of the user; determining, by the processor based on the viewing trajectories, a second group of viewport portions of the plurality of viewport portions, wherein the second group of viewport portions is associated with predicted non-viewing patterns of the user; generating, by the processor, a payoff matrix associated with the viewing trajectories, the first group of viewport portions, and the second group of viewport portions; generating, by the processor executing game theory code, a best possible decision for the user with respect to viewing the plurality of the viewport portions; determining, by the processor executing video rendering code with respect to the best possible decision, a third group of viewport portions of the plurality of viewport portions; and presenting, by the processor to the user via a GUI, the third group of viewport portions.

A second aspect of the invention provides a computer program product, comprising a computer readable hardware storage device storing a computer readable program code, the computer readable program code comprising an algorithm that when executed by a processor of an electronic device implements a video file modification and presentation method, the method comprising: continuously receiving, by the processor, a video stream; dividing by the processor, a video frame of the video stream into a plurality of viewport portions, wherein each viewport portion of the plurality of viewport portions comprises an associated meta data portion; detecting, by the processor via a sensor of the electronic device, an eye focus of a user with respect to a first viewport portion of the plurality of viewport portions; determining, by the processor executing machine learning code with respect to results of the detecting, an importance score for each the viewport portion; determining, by the processor based each the importance score, viewing trajectories for viewing each the viewport portion; determining, by the processor based on the viewing trajectories, a first group of viewport portions of the plurality of viewport portions, wherein the first group of viewport portions is associated with predicted viewing patterns of the user; determining, by the processor based on the viewing trajectories, a second group of viewport portions of the plurality of viewport portions, wherein the second group of viewport portions is associated with predicted non-viewing patterns of the user; generating, by the processor, a payoff matrix associated with the viewing trajectories, the first group of viewport portions, and the second group of viewport portions; generating, by the processor executing game theory code, a best possible decision for the user with respect to viewing the plurality of the viewport portions; determining, by the processor executing video rendering code with respect to the best possible decision, a third group of viewport portions of the plurality of viewport portions; and presenting, by the processor to the user via a GUI, the third group of viewport portions.

A third aspect of the invention provides an electronic device comprising a processor coupled to a computer-readable memory unit, the memory unit comprising instructions that when executed by the processor implements a video file modification and presentation method comprising: continuously receiving, by the processor, a video stream; dividing by the processor, a video frame of the video stream into a plurality of viewport portions, wherein each viewport portion of the plurality of viewport portions comprises an associated meta data portion; detecting, by the processor via a sensor of the electronic device, an eye focus of a user with respect to a first viewport portion of the plurality of viewport portions; determining, by the processor executing machine learning code with respect to results of the detecting, an importance score for each the viewport portion; determining, by the processor based each the importance score, viewing trajectories for viewing each the viewport portion; determining, by the processor based on the viewing trajectories, a first group of viewport portions of the plurality of viewport portions, wherein the first group of viewport portions is associated with predicted viewing patterns of the user; determining, by the processor based on the viewing trajectories, a second group of viewport portions of the plurality of viewport portions, wherein the second group of viewport portions is associated with predicted non-viewing patterns of the user; generating, by the processor, a payoff matrix associated with the viewing trajectories, the first group of viewport portions, and the second group of viewport portions; generating, by the processor executing game theory code, a best possible decision for the user with respect to viewing the plurality of the viewport portions; determining, by the processor executing video rendering code with respect to the best possible decision, a third group of viewport portions of the plurality of viewport portions; and presenting, by the processor to the user via a GUI, the third group of viewport portions.

The present invention advantageously provides a simple method and associated system capable of accurately modifying and presenting a video stream.

DETAILED DESCRIPTION

Figure 1:
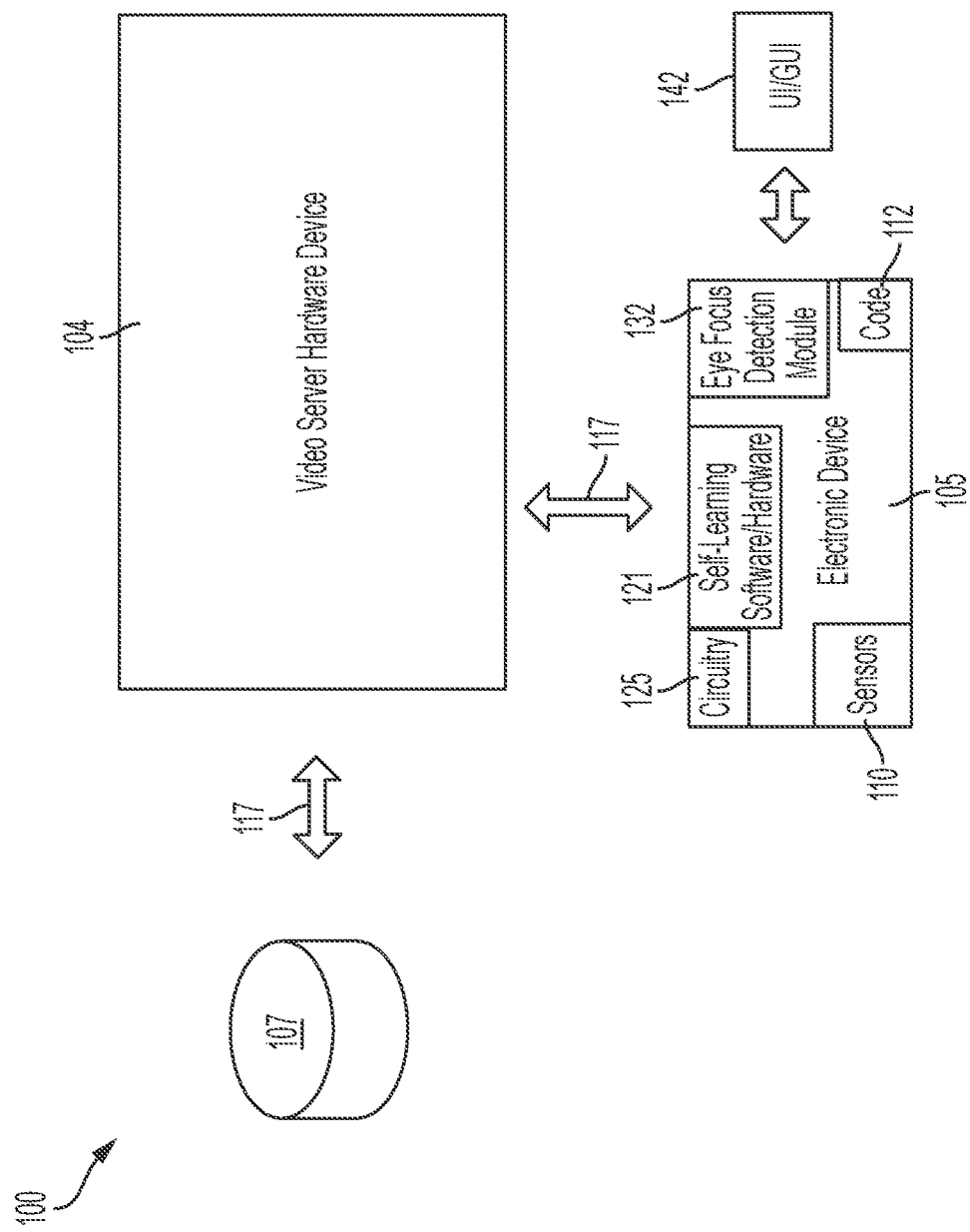
FIG. 1 illustrates a system for improving video-based software technology for dividing a video frame into viewpoint portions associated with an eye focus of a user for presentation, in accordance with embodiments of the present invention.

FIG. 1 illustrates a system 100 improving video-based software technology for dividing a video frame into viewpoint portions associated with an eye focus of a user for presentation, in accordance with embodiments of the present invention. A typical video system may implement processes associated with recording 360-degree video streams using multiple cameras or a device which comprising multiple embedded camera lenses. For example, a video system may capture or record overlapping viewing angles simultaneously thereby enabling a video frame stitching process to merge all video frames into a single spherical, cuboid, or pyramid shaped video frame. The aforementioned simultaneous process may be associated with excess data consumption and may require extra bandwidth with respect to retrieving 2-dimensional video frames. Typical solutions may include enabling a piece-wise view-port rendering process. Drawbacks associated with enabling a piece-wise view-port rendering process may include difficulties associated with predicting user eye contact with respect to specified viewports. Likewise, it may be difficult to predict a user viewport choice as user behavior may vary between differing users. For example, a video flat frame may be divided into multiple view-ports (i.e., a section of a videoframe). Each view-port comprises metadata for addressing the viewport such that when a user focus is associated with a particular view-port, a user behavior prediction algorithm may be enabled to predict a next viewing zone of the user. Therefore (with respect to initially rendered view-ports), the behavior prediction algorithm may be enabled based on video frame analysis or data analysis from n number of a user's pattern which may not include a best possible solution for the user. Therefore system 100 enables video file modification functionality improvements for selectively rendering viewports using a game theory approach in order to reduce a 360-degree video frame rendering cost and dependencies associated with an initial behavior pattern analysis of 'n' number of users.

System 100 is configured to improve video-based software technology for dividing a video frame into viewpoint portions associated with an eye focus of a user for presentation by:

1. Generating payoff function code for generating an individual weight within a cell (of a matrix) with respect to a player 1 (a user) and a player 2's (e.g., a rendering algorithm) relative location and object importance adjacent to and within rendering viewports.

2. Generating a decision matrix with respect player 1s and player 2s last move by using the pay-off function (i.e., game theory) and converting multiple viewports of the pay-off function into respective scores with respect to a decision of player 2 that is not dependent on player 1 selections.

3. Generating a consequence matrix for generating a loss matrix with respect to a selected viewport of player 1 and a selected viewport for rendering from player 2.

4. Identifying a set of best possible solution blocks from the decision matrix which may generate a best choice for player 1 and player 2 using Nash equilibrium code such that a best possible solution identified is isolated from a choice of a user and associated rendering algorithm.

Therefore, system 100 enables a process for identifying an individual viewport and using the identification information to execute an algorithm for constructing a decision matrix. Likewise, a best viewport is identified for rendering via execution of game theory code. The aforementioned algorithm is associated with a rendering algorithm for rendering a video frame irrespective of a user decision such that a user may achieve a best available viewport rendering trajectory. Nash equilibrium code may be executed for identifying a set of best possible solution blocks from a matrix which may be used to select a best choice for a player 1 and a player 2. The aforementioned process is independent from a choice of the user and a rendering algorithm choice.

System 100 of FIG. 1 includes a video server hardware device 104 (i.e., specialized hardware device), an electronic device 105 (including a UI/GUI 142), and a database 107 (e.g., a cloud-based system) interconnected through a network 117. Electronic device 105 may include a personal device provided to a user. Electronic device 105 may be Bluetooth enabled to provide connectivity to any type of system. Electronic device 105 includes self-learning software code/hardware structure 121, specialized circuitry 125 (that may include specialized software), an eye focus detection module 132, sensors 110, and code 112 (including configuration code and generated self-learning software code for transfer to/from video server hardware device 104). Eye focus detection module 132 may include an audio/video retrieval device that may include any type of audio/video device including, inter alia, a camera with gaze point tracking hardware and software, a video camera, a still shot camera, etc. Gaze point tracking comprises a process for tracking motion of an eye by measuring a point of gaze (i.e., a direction that a user is viewing). Gaze point tracking hardware comprises a device for measuring eye positions and eye movement. Sensors 110 may include any type of internal or external sensor (or biometric sensor) including, inter alia, ultrasonic three-dimensional sensor modules, a heart rate monitor, a blood pressure monitor, a temperature sensor, a pulse rate monitor, an ultrasonic sensor, an optical sensor, a video retrieval device, an audio retrieval device, humidity sensors, voltage sensors, etc. Video server hardware device 104, electronic device 105, and database 107 may each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, video server hardware device 104, electronic device 105, and database 107 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-5. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software technology for improving video-based software technology for dividing a video frame into viewpoint portions associated with an eye focus of a user for presentation. Network 117 may include any type of network including, inter alia, a local area network, (LAN), a wide area network (WAN), the Internet, a wireless network, etc. Alternatively, network 117 may include an application programming interface (API).

The following steps associated with system 100 describes an implementation process for improving video-based software technology for dividing a video frame into viewpoint portions associated with an eye focus of a user for presentation. The process is initiated with respect to execution of 360-degree video rendering code via usage of a game theory approach such that a user is designated as a player #1 and a video rendering algorithm (and associated software/hardware) is designated as a player #2. During a video stream presentation (i.e., at any given point of time) multiple choices are available for player #1 to select a specified viewport from n numbers of viewports. The selection is independent from player #2's selection. The selections may be enabled via prediction generated based on a past behavioral pattern analysis of multiple users with respect to a number of views in each rendering viewport. Likewise, an alternative manual selection of specific viewports with respect to designated interesting objects will cause the algorithm to execute with respect to a greedy situation associated with high costs. Therefore, identification of suitable viewports for rendering is very important in terms of user experience and network bandwidth usage. The aforementioned issues may be resolved and optimized via implementation of the following steps:

In step 1, a decision matrix (software) is generated with respect to a last move for player #1 (i.e., a user) and player #2 (i.e., a rendering algorithm). Payoff function may be used to generate the decision matrix. Payoff function code is executed to generate an individual weight within a cell (of the decision matrix) with respect to player #1 and player #2's relative location and object importance adjacent and within rendering viewports.

In step 2, the payoff function is executed for converting multiple viewports into respective scores such that a decision of player #2 is not dependent on player #1's selections. Likewise (with respect to a selected viewport of player #1 and a selected viewport for rendering from player #2), the payoff function is executed for generating a consequence matrix which may be used to generate a loss matrix such that the loss matrix is minimized while a focus viewport for player #2 is modified.

In step 3 (with respect to a conflict of selections), the rendering algorithm enables a deadlock situation requiring a tie break scenario. Therefore, Nash equilibrium code is executed to identify a set of best possible solution blocks from the decision matrix and generate a best selection for player #1 and player #2. The selection is generated independent from selection of the user # and rendering algorithm (user #2).

Figure 2:
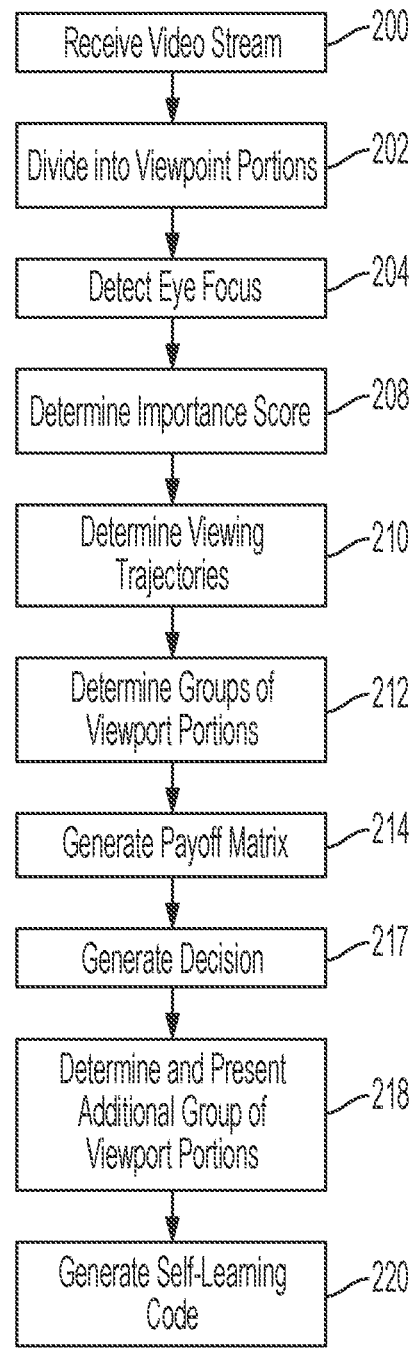
FIG. 2 illustrates an algorithm detailing a process flow enabled by the system of FIG. 1 for improving video-based software technology for dividing a video frame into viewpoint portions associated with an eye focus of a user for presentation, in accordance with embodiments of the present invention.

FIG. 2 illustrates an algorithm detailing a process flow enabled by system 100 of FIG. 1 for improving video-based software technology for dividing a video frame into viewpoint portions associated with an eye focus of a user for presentation, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by video server hardware device 104 and electronic device 105. In step 200, a video stream is continuously received by an electronic device. In step 202, a video frame (of the video stream) is divided into viewport portions. Each viewport portion comprises an associated meta data portion. In step 204, an eye focus of a user is detected via a sensor of the electronic device. The user focus is detected with respect to a first viewport portion of the viewport portions. Detecting the eye focus of the user may include enabling gaze point tracking hardware for measuring eye positions and eye movement of eyes of the user.

In step 208, an importance score for each viewport portion is determined via executing of machine learning code with respect to results of step 204. In step 210, viewing trajectories for viewing each viewport portion are determined based each importance score. Additionally, a digital cell matrix comprising each importance score for said determining the viewing trajectories may be generated.

In step 212, a first group of viewport portions is determined based on the viewing trajectories. The first group of viewport portions is associated with predicted viewing patterns of the user. Additionally, a second group of viewport portions (and/or additional groups) is determined based on the viewing trajectories. The second group of viewport portions is associated with predicted non-viewing patterns of the user. In step 214, a payoff matrix is generated. The payoff matrix is associated with the viewing trajectories, the first group of viewport portions, and the second group of viewport portions (and any additional groups of viewports). The payoff matrix may be associated with a conflict of choice. Likewise, the best possible decision may be selected based on Nash equilibrium attributes for resolving the conflict of choice.

In step 217, a best possible decision for the user with respect to viewing the viewport portions is generated via execution of game theory code. The best possible decision may be generated independent from a choice of the user. Additionally, each associated meta data portion may be modified with attributes describing the best possible decision.

In step 218, a third group of viewport portions is determined via execution of video rendering code with respect to the best possible decision. The third group of viewport portions is presented to the user via a GUI. In step 220, self-learning software code for executing future video file modification and presentation processes is generated based on results of step 218.

Figure 3:
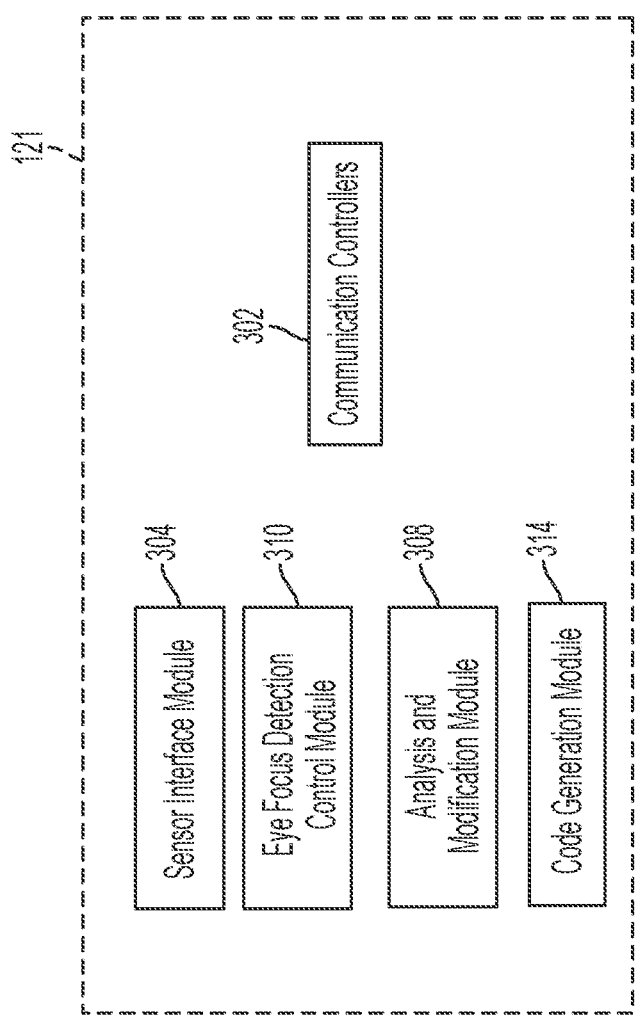
FIG. 3 illustrates an internal structural view of the self-learning software/hardware structure of FIG. 1, in accordance with embodiments of the present invention.

FIG. 3 illustrates an internal structural view of self-learning software/hardware structure 121 of FIG. 1, in accordance with embodiments of the present invention.

Self-learning software/hardware structure 121 includes a sensor interface module 304, an eye focus detection control module 310, an analysis and modification module 308, a code generation module 314, and communication controllers 302. Sensor interface module 304 comprises specialized hardware and software for controlling all functions related to sensors 110 of FIG. 1. Eye focus detection control module 310 comprises specialized hardware and software for controlling all eye focus detection functions configured to modify self-learning configuration and rules and implementing the process described with respect to the algorithm of FIG. 2. Analysis and modification module 308 comprises specialized hardware and software for controlling all functions related to the steps of FIG. 2. Code generation module 314 comprises specialized hardware and software for controlling all functions related to generating machine learning feedback for generating self-learning software code for executing video modification and presentation processes. Communication controllers 302 are enabled for controlling all communications between sensor interface module 304, eye focus detection control module 310, analysis and modification module 308, and code generation module 314.

Figure 4:
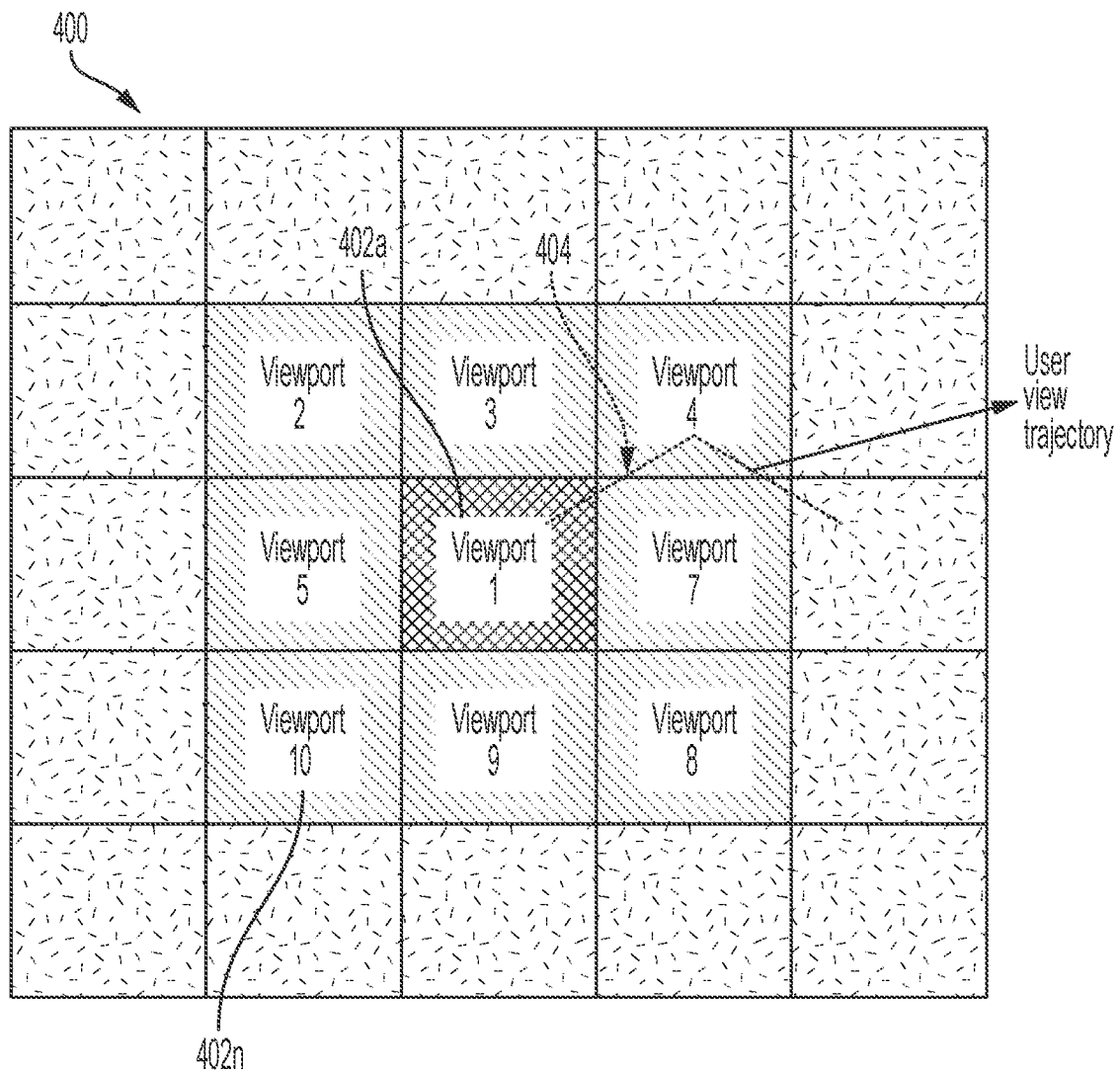
FIG. 4 illustrates a video frame comprising multiple viewport sections, in accordance with embodiments of the present invention.

FIG. 4 illustrates a video frame 400 comprising multiple viewport sections 402a . . . 402n comprising viewport 1-viewport 8, in accordance with embodiments of the present invention. The video frame 400 is associated with a user viewing viewport 1. Viewport 1 is located adjacent to viewport 2-viewport 8 surrounding viewport 1. Therefore, the user may select a focus path 404 from viewport 1 to viewport 4 thereby updating a visual rendering. Subsequently, game theory code is executed for enabling a best choice of viewport rendering for the user. Game theory code is executed based on based on multiple players and their associated selections. The video frame 400 illustrated in FIG. 4 is associated with a 360-degree video rendering aspect such that the user is a player #1 and a video rendering choice is a player #2. Therefore, at any given point of time, there are multiple selection choices for player #1 to select a particular viewport from n numbers of viewports. This selection is independent from a player #2 selection. Likewise, a payoff function may be constructed using object recognition of individual viewports. If a viewport contains x number of objects then a payoff function may generate a score where, c=f(x).

Figure 5:
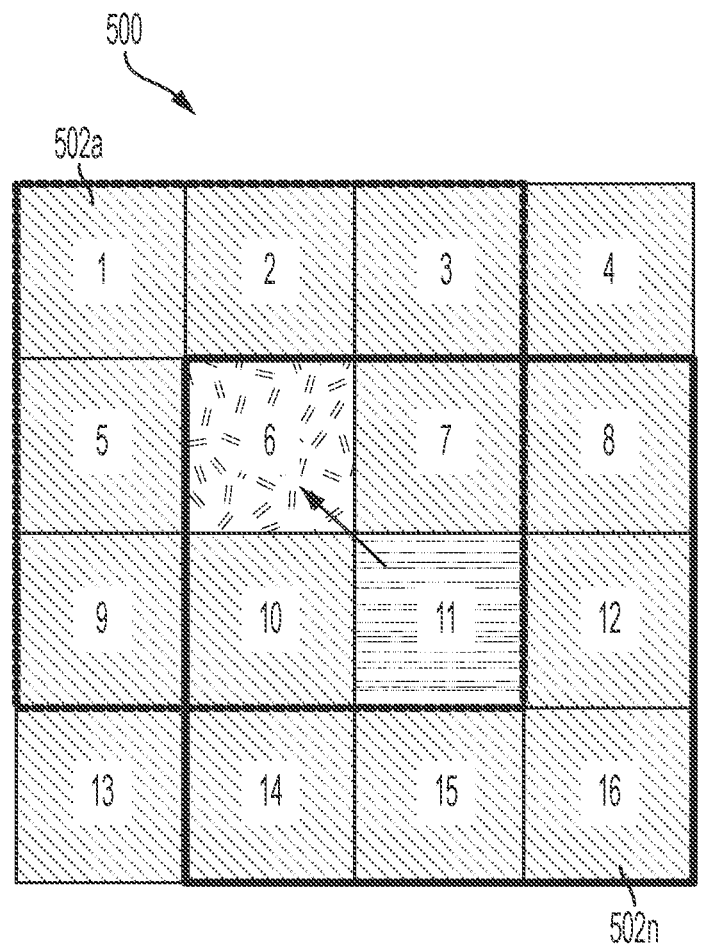
FIG. 5 illustrates an implementation example associated with a consequence matrix generated with respect to a payoff function, in accordance with embodiments of the present invention.

FIG. 5 illustrates an implementation example associated with a consequence matrix 500 generated with respect to a payoff function, in accordance with embodiments of the present invention. The payoff function enables multiple viewports 1-16 (502a . . . 502n) to be converted into respective scores such that a decision of player #2 is not dependent on a player #1's choices. Likewise, a selected viewport of player #1 and a selected viewport for rendering from player #2 may enable a process for generating a consequence matrix. For example (with respect to a decision #1), a viewport 11 is associated with a focus point for a player #1 (i.e., a user) and viewport 6 is associated with a focus point for player #2 (i.e., a rendering algorithm). Initially, all viewports 1, 2, 3, 5, 6, 7, 9, 10, and 11 are rendered but when a user focus is associated with viewport 11, the user is able to clearly view viewports 6, 7, 10, and 11 as the aforementioned viewports comprise union blocks for both players. Likewise, viewports 8, 12, 16, 15, and 14 comprise lost viewports. Subsequently, if (in a next video frame), a user focus moves from viewport 11 to viewport 6, then there will be no loss with respect to any viewports as all the viewports have been rendered. Therefore, for two successive frames, a viewport loss has been reduced from 5 to 0. Additionally, from a rendering aspect in a video frame 1, a total number of viewports loaded for viewing is equal to 9 and a second number of viewports loaded for viewing is equal to 0 thereby generating a total of 9 viewports loaded for viewing. If player #2 follows the focus of player #1 then a viewport loss would be equal to 0 with 14 total rendered viewports (6, 7, 8, 10, 11, 12, 14, 15, 16, 1, 2, 3, 5, and 9). Therefore, if an executed decision includes a "follow the focus" action, then an associated matrix will include (loss, load)=(0,14). Likewise, an additional decision #1 is associated with a decision matrix (loss, load)=(5, 9). Additionally, objects within a viewport may be associated with another parameter to generate a loss value such that all viewports having a same value of identified objects are considered.

Figure 6:
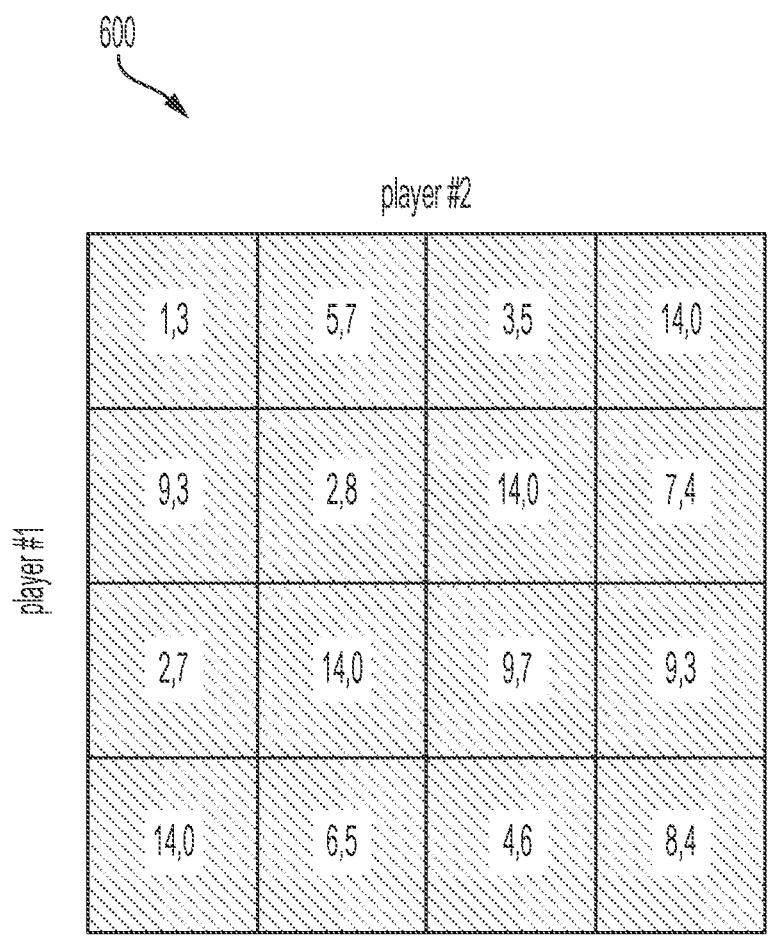
FIG. 6 illustrates a user focus matrix, in accordance with embodiments of the present invention.

FIG. 6 illustrates a user focus matrix 600, in accordance with embodiments of the present invention. Execution of user focus matrix 600 enables rendering algorithm focus combination code associated with any two or multiple frames for generation of a decision matrix generated with respect to a game theory matrix.

Figure 7:
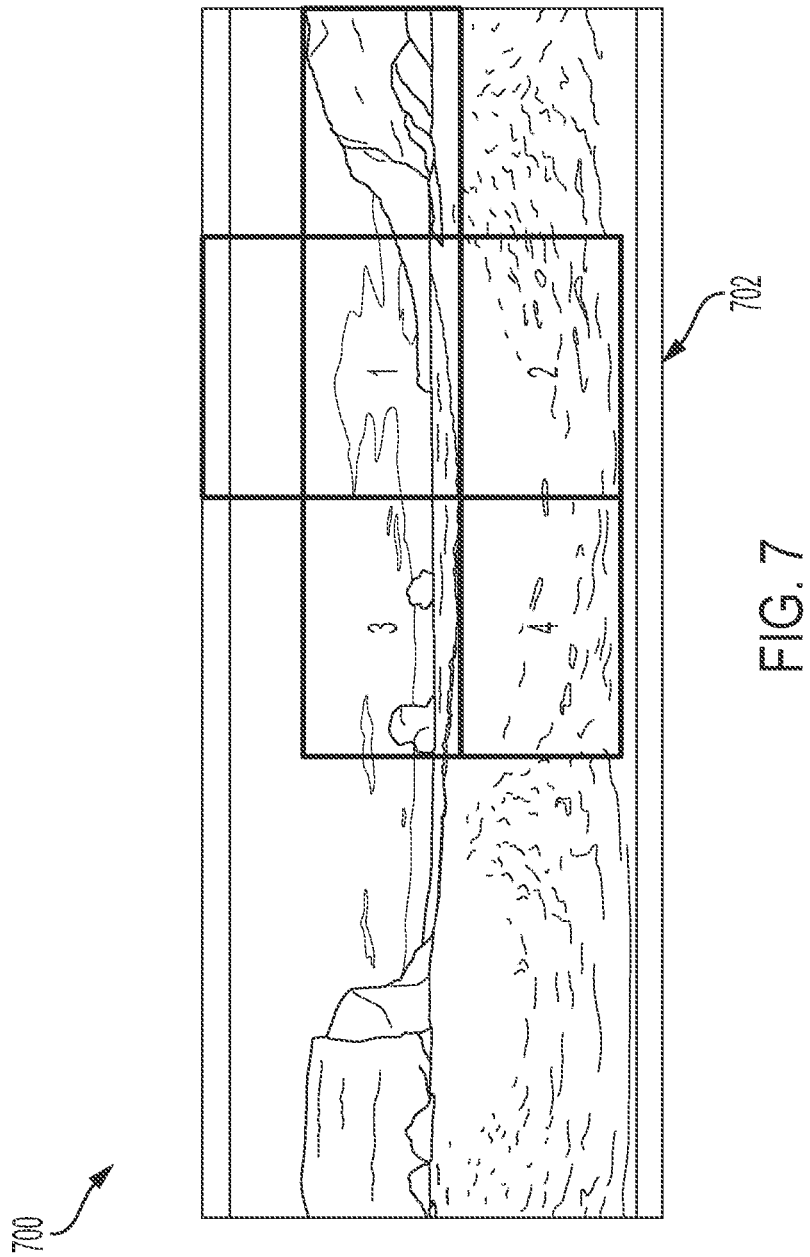
FIG. 7 illustrates a view region, in accordance with embodiments of the present invention.

FIG. 7 illustrates a view region 700, in accordance with embodiments of the present invention. View region 700 is subdivided in to multiple viewports 702 (1-4). Each viewport port comprises a rectangular shape covering a specific view of view region 700. During a process for viewing a video frame, an individual viewport includes a viewable portion of the video frame. For example, a user may view a video frame comprising a view of a sea, the sun, and a beach and at a specified point of time the user focuses on a viewport (#1) comprising a view of the sun. Additionally, multiple adjacent viewports are available for view additional interesting objects. For example, viewport #3 may comprise a better feature than viewport #2 and viewport #4. Therefore, game theory is executed such that a payoff function enables specified objects as arguments such as, inter alia, y=f (x1, x2, x3 . . . ), where x1, x2, x3 . . . comprise objects within viewports and y=payoff score. The game theory code comprises a Nash equilibrium set such that a trajectory is generated using Nash equilibrium set elements resulting in a video viewport rendering algorithm comprising a player 1 and a user as a player 2. The Nash equilibrium set generates a best choice for users, irrespective of their choices (dependent or independent) thereby determining which viewport will be rendered first as a Nash equilibrium set element thereby determining a best possible viewport which a user will look for with respect to the algorithm will render those viewport first.

Figure 8:
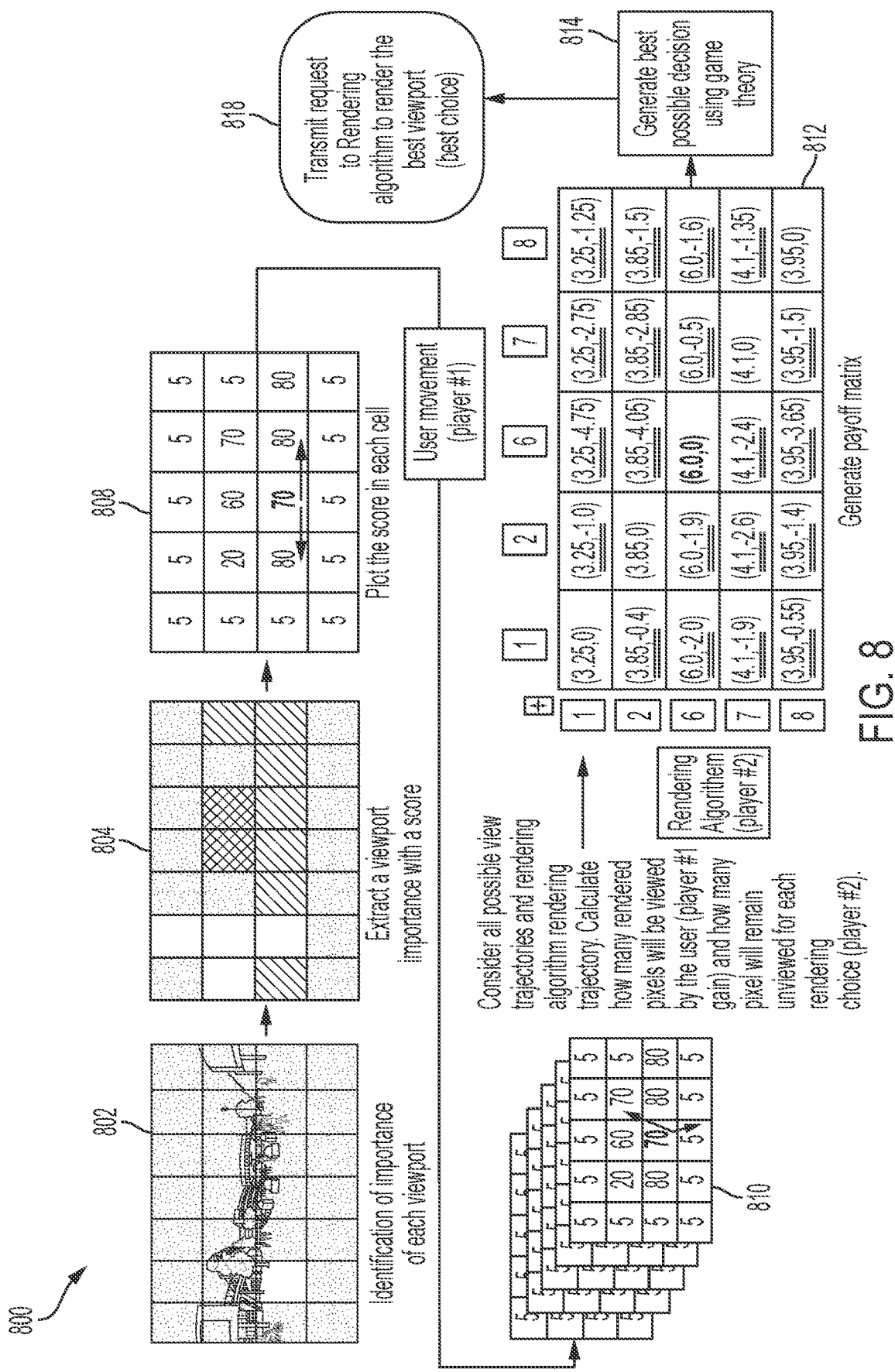
FIG. 8 illustrates an algorithm for generating a best possible decision, in accordance with embodiments of the present invention.

FIG. 8 illustrates an algorithm 800 for generating a best possible decision, in accordance with embodiments of the present invention. Block 802 enables a process for identifying an importance of each viewport. Block 804 enables a process for extracting a viewport importance level associated with a viewport score. Block 808 enables a process for plotting each score in an associated cell of a matrix. Block 810 enables a process for considering all possible view trajectories and an associated rendering algorithm rendering trajectory. Additionally, view based calculations are executed. Block 812 enables a process for generating a resulting payoff matrix. Block 814 enables a process for generating a best possible decision (for viewport viewing) via execution of game theory code. Block 818 enables a process for transmitting a rendering request to a rendering algorithm for rendering a best viewport.

Figure 9:
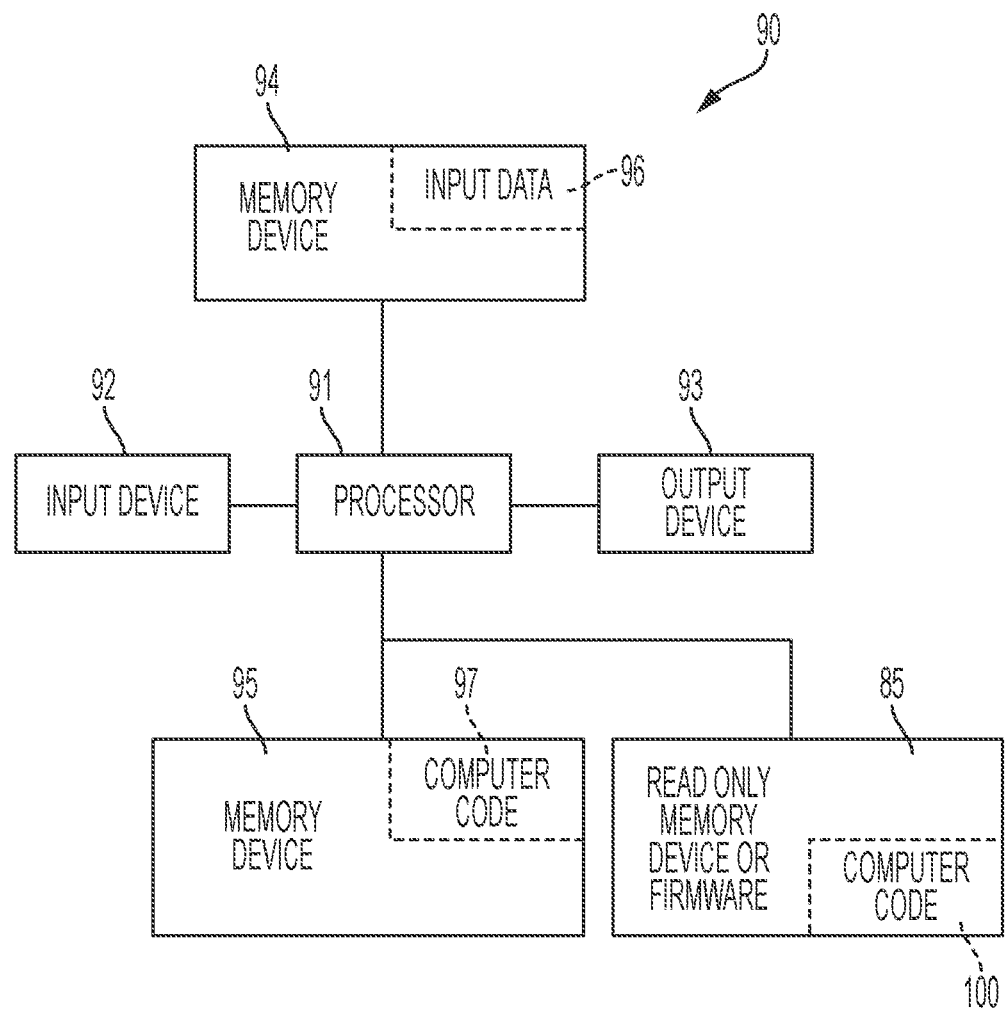
FIG. 9 illustrates a computer system used by the system of FIG. 1 for improving video-based software technology for dividing a video frame into viewpoint portions associated with an eye focus of a user for presentation, in accordance with embodiments of the present invention.

FIG. 9 illustrates a computer system 90 (e.g., electronic device 105 and/or video server hardware device 104 of FIG. 1) used by or comprised by the system of FIG. 1 for improving video-based software technology for dividing a video frame into viewpoint portions associated with an eye focus of a user for presentation, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 9 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithms of FIGS. 2 and 8) for improving video-based software technology for dividing a video frame into viewpoint portions associated with an eye focus of a user for presentation. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include algorithms (e.g., the algorithms of FIGS. 2 and 8) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve video-based software technology for dividing a video frame into viewpoint portions associated with an eye focus of a user for presentation. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving video-based software technology for dividing a video frame into viewpoint portions associated with an eye focus of a user for presentation. In another embodiment, the invention provides a business method that performs the process steps of the invention on a subscription, advertising, and/or fee basis.

That is, a service supplier, such as a Solution Integrator, could offer to enable a process for improving video-based software technology for dividing a video frame into viewpoint portions associated with an eye focus of a user for presentation. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 9 shows the computer system 90 as a configuration of hardware and software, any configuration of hardware and software, as would be known to a person of ordinary skill in the art, may be utilized for the purposes stated supra in conjunction with the computer system 90 of FIG. 9. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
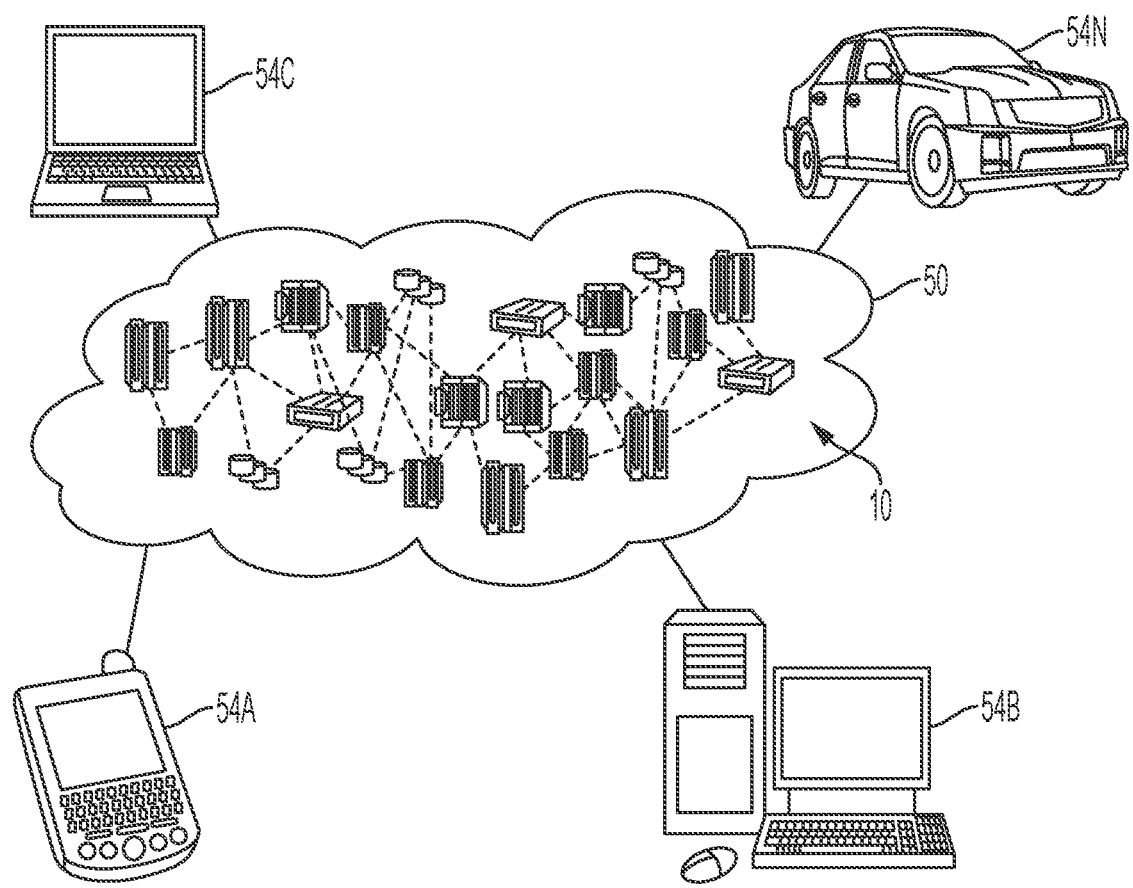
FIG. 10 illustrates a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 10 are intended to be illustrative only and that computing nodes 10 and cloud computing environment 50 can communicate with any type of computerized device over any type of network and/or network addressable connection (e.g., using a web browser).

Figure 11:
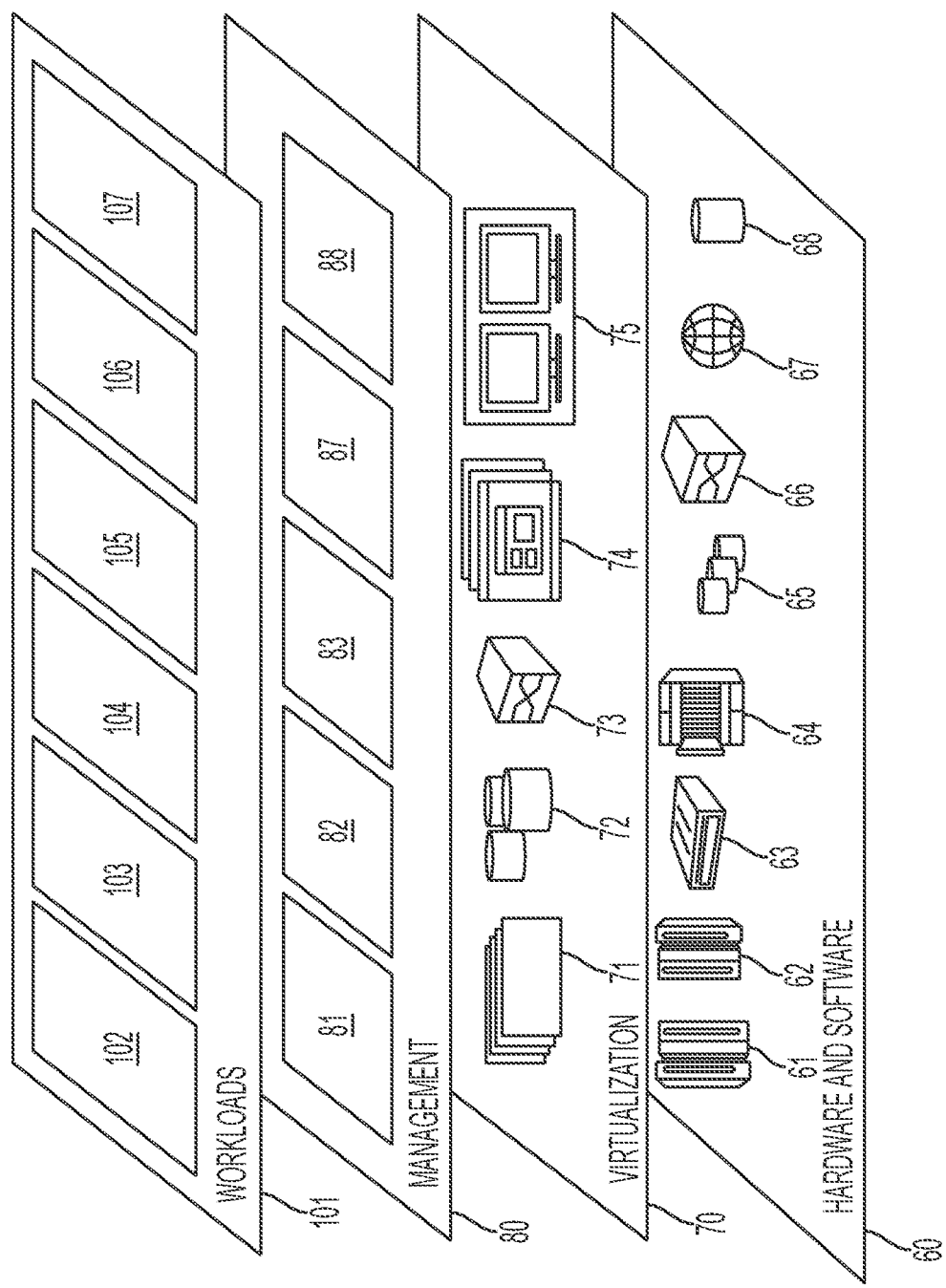
FIG. 11 illustrates a set of functional abstraction layers provided by cloud computing environment, in accordance with embodiments of the present invention.

Referring now to FIG. 11, a set of functional abstraction layers provided by cloud computing environment 50 (see FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving video-based software technology for dividing a video frame into viewpoint portions associated with an eye focus of a user for presentation 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A video file modification and presentation method comprising:

continuously receiving, by a processor of an electronic device, a video stream;
dividing by said processor, a video frame of said video stream into a plurality of viewport portions, wherein each viewport portion of said plurality of viewport portions comprises an associated meta data portion;
detecting, by said processor via a sensor of said electronic device, an eye focus of a user with respect to a first viewport portion of said plurality of viewport portions;
determining, by said processor executing machine learning code with respect to results of said detecting, an importance score for each said viewport portion;
determining, by said processor based each said importance score, viewing trajectories for viewing each said viewport portion;
determining, by said processor based on said viewing trajectories, a first group of viewport portions of said plurality of viewport portions, wherein said first group of viewport portions is associated with predicted viewing patterns of said user;
determining, by said processor based on said viewing trajectories, a second group of viewport portions of said plurality of viewport portions, wherein said second group of viewport portions is associated with predicted non-viewing patterns of said user;
generating, by said processor, a payoff matrix associated with said viewing trajectories, said first group of viewport portions, and said second group of viewport portions;
generating, by said processor executing game theory code, a best possible decision for said user with respect to viewing said plurality of said viewport portions;
determining, by said processor executing video rendering code with respect to said best possible decision, a third group of viewport portions of said plurality of viewport portions; and
presenting, by said processor to said user via a GUI, said third group of viewport portions.

2. The method of claim 1, wherein said best possible decision is generated independent from a choice of said user.

3. The method of claim 1, wherein said payoff matrix is associated with a conflict of choice, and wherein said best possible decision is selected based on Nash equilibrium attributes for resolving said conflict of choice.

4. The method of claim 1, wherein said detecting said eye focus of said user comprises enabling gaze point tracking hardware for measuring eye positions and eye movement of eyes of said user.

5. The method of claim 1, further comprising:
generating, by said processor, a digital cell matrix comprising each said importance score for said determining said viewing trajectories.

6. The method of claim 1, further comprising:
generating, by said processor based on results of said presenting, self-learning software code for executing future video file modification and presentation processes.

7. The method of claim 1, further comprising:
modifying, by said processor, each said associated meta data portion with attributes describing said best possible decision.

8. The method of claim 1, further comprising:
providing at least one support service for at least one of creating, integrating, hosting, maintaining, and deploying computer-readable code in the control hardware, said code being executed by the computer processor to implement: said continuously receiving, said dividing, said detecting, said determining said importance score, said determining said viewing trajectories, said determining said first group of viewport portions, said determining said second group of viewport portions, said generating said payoff matrix, said generating said best possible decision, said determining said third group of viewport portions, and said presenting.

9. A computer program product, comprising a non-transitory computer readable hardware storage device storing a computer readable program code, said computer readable program code comprising an algorithm that when executed by a processor of an electronic device implements a video file modification and presentation method, said method comprising:
continuously receiving, by said processor, a video stream;
dividing by said processor, a video frame of said video stream into a plurality of viewport portions, wherein each viewport portion of said plurality of viewport portions comprises an associated meta data portion;
detecting, by said processor via a sensor of said electronic device, an eye focus of a user with respect to a first viewport portion of said plurality of viewport portions;
determining, by said processor executing machine learning code with respect to results of said detecting, an importance score for each said viewport portion;
determining, by said processor based each said importance score, viewing trajectories for viewing each said viewport portion;
determining, by said processor based on said viewing trajectories, a first group of viewport portions of said plurality of viewport portions, wherein said first group of viewport portions is associated with predicted viewing patterns of said user;
determining, by said processor based on said viewing trajectories, a second group of viewport portions of said plurality of viewport portions, wherein said second group of viewport portions is associated with predicted non-viewing patterns of said user;
generating, by said processor, a payoff matrix associated with said viewing trajectories, said first group of viewport portions, and said second group of viewport portions;
generating, by said processor executing game theory code, a best possible decision for said user with respect to viewing said plurality of said viewport portions;
determining, by said processor executing video rendering code with respect to said best possible decision, a third group of viewport portions of said plurality of viewport portions; and
presenting, by said processor to said user via a GUI, said third group of viewport portions.

10. The computer program product of claim 9, wherein said best possible decision is generated independent from a choice of said user.

11. The computer program product of claim 9, wherein said payoff matrix is associated with a conflict of choice, and wherein said best possible decision is selected based on Nash equilibrium attributes for resolving said conflict of choice.

12. The computer program product of claim 9, wherein said detecting said eye focus of said user comprises enabling gaze point tracking hardware for measuring eye positions and eye movement of eyes of said user.

13. The computer program product of claim 9, wherein said method further comprises:

generating, by said processor, a digital cell matrix comprising each said importance score for said determining said viewing trajectories.

14. The computer program product of claim 9, wherein said method further comprises:

generating, by said processor based on results of said presenting, self-learning software code for executing future video file modification and presentation processes.

15. The computer program product of claim 9, wherein said method further comprises:

modifying, by said processor, each said associated meta data portion with attributes describing said best possible decision.

16. An electronic device comprising a processor coupled to a non-transitory computer-readable memory unit, said memory unit comprising instructions that when executed by the processor implements a video file modification and presentation method comprising:

continuously receiving, by said processor, a video stream;

dividing by said processor, a video frame of said video stream into a plurality of viewport portions, wherein each viewport portion of said plurality of viewport portions comprises an associated meta data portion;

detecting, by said processor via a sensor of said electronic device, an eye focus of a user with respect to a first viewport portion of said plurality of viewport portions;

determining, by said processor executing machine learning code with respect to results of said detecting, an importance score for each said viewport portion;

determining, by said processor based each said importance score, viewing trajectories for viewing each said viewport portion;

determining, by said processor based on said viewing trajectories, a first group of viewport portions of said plurality of viewport portions, wherein said first group of viewport portions is associated with predicted viewing patterns of said user;

determining, by said processor based on said viewing trajectories, a second group of viewport portions of said plurality of viewport portions, wherein said second group of viewport portions is associated with predicted non-viewing patterns of said user;

generating, by said processor, a payoff matrix associated with said viewing trajectories, said first group of viewport portions, and said second group of viewport portions;

generating, by said processor executing game theory code, a best possible decision for said user with respect to viewing said plurality of said viewport portions;

determining, by said processor executing video rendering code with respect to said best possible decision, a third group of viewport portions of said plurality of viewport portions; and presenting, by said processor to said user via a GUI, said third group of viewport portions.

17. The electronic device of claim 16, wherein said best possible decision is generated independent from a choice of said user.

18. The electronic device of claim 16, wherein said payoff matrix is associated with a conflict of choice, and wherein said best possible decision is selected based on Nash equilibrium attributes for resolving said conflict of choice.

19. The electronic device of claim 16, wherein said detecting said eye focus of said user comprises enabling gaze point tracking hardware for measuring eye positions and eye movement of eyes of said user.

20. The electronic device of claim 16, wherein said method further comprises:

generating, by said processor, a digital cell matrix comprising each said importance score for said determining said viewing trajectories.

\* \* \* \* \*